US011521443B2

(12) United States Patent
Lee et al.

(10) Patent No.: US 11,521,443 B2
(45) Date of Patent: Dec. 6, 2022

(54) DOOR LOCK DEVICE AND CONTROL METHOD FOR DOOR LOCK DEVICE

(71) Applicant: SAMSUNG ELECTRONICS CO., LTD., Suwon-si (KR)

(72) Inventors: Hojung Lee, Seoul (KR); Myoung Soo You, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 210 days.

(21) Appl. No.: 16/494,457

(22) PCT Filed: Mar. 14, 2018

(86) PCT No.: PCT/KR2018/002985
§ 371 (c)(1),
(2) Date: Sep. 16, 2019

(87) PCT Pub. No.: WO2018/169304
PCT Pub. Date: Sep. 20, 2018

(65) Prior Publication Data

US 2021/0090364 A1 Mar. 25, 2021

(30) Foreign Application Priority Data

Mar. 16, 2017 (KR) ........................ 10-2017-0032992

(51) Int. Cl.
*G07C 9/00* (2020.01)
*B60R 25/24* (2013.01)
*H04L 9/40* (2022.01)

(52) U.S. Cl.
CPC .......... *G07C 9/00309* (2013.01); *B60R 25/24* (2013.01); *H04L 63/1466* (2013.01); *G07C 2009/00388* (2013.01)

(58) Field of Classification Search
None
See application file for complete search history.

(56) References Cited

U.S. PATENT DOCUMENTS 8,676,273 B1 * 3/2014 Fujisaki ................ H04M 3/533 455/567
9,512,643 B1 * 12/2016 Keefe ..................... E05B 47/06
(Continued)

FOREIGN PATENT DOCUMENTS

JP 2014-150425 8/2014
JP 2016-14259 1/2016
(Continued)

OTHER PUBLICATIONS

International Search Report for PCT/KR2018/002985 dated Aug. 22, 2018, 5 pages.
(Continued)

*Primary Examiner* — Carlos Garcia
(74) *Attorney, Agent, or Firm* — Nixon & Vanderhye, P.C.

(57) ABSTRACT

Disclosed is a door lock device. The door lock device comprises: a communication unit for receiving location information of an electronic device and a key from the electronic device; a location information reception unit for receiving location information of the door lock device; a door lock unit having a locked state or a released state; and a control unit electrically connected with the communication unit, the location information reception unit, and the door lock unit, wherein the control unit determines a distance between the electronic device and the door lock device on the basis of the location information of the electronic device and the location information of the door lock device, and determines whether to release the door lock unit on the basis of information of the distance.

18 Claims, 8 Drawing Sheets

(56) References Cited

U.S. PATENT DOCUMENTS

| | | | | |
|---|---|---|---|---|
| 9,894,492 | B1 * | 2/2018 | Elangovan | G07C 9/00309 |
| 10,373,415 | B2 * | 8/2019 | Atsumi | B60R 25/002 |
| 10,719,999 | B2 * | 7/2020 | Love | G07C 9/00309 |
| 11,080,953 | B2 * | 8/2021 | Kim | H04W 12/068 |
| 2015/0074805 | A1 | 3/2015 | Choi et al. | |
| 2016/0001742 | A1 * | 1/2016 | Miyazawa | G07C 9/00309 701/2 |
| 2016/0159279 | A1 * | 6/2016 | Mori | G07C 9/00174 340/438 |
| 2016/0267734 | A1 | 9/2016 | Hamada et al. | |
| 2018/0114385 | A1 * | 4/2018 | Gullicksen | G07C 9/00571 |

FOREIGN PATENT DOCUMENTS

| | | |
|---|---|---|
| KR | 10-2006-0070980 | 6/2006 |
| KR | 10-2013-0126193 | 11/2013 |
| KR | 10-2014-0134010 | 11/2014 |
| KR | 10-2015-0137947 | 12/2015 |
| KR | 10-1588197 | 2/2016 |
| KR | 10-2016-0110100 | 9/2016 |

OTHER PUBLICATIONS

Written Opinion of the ISA for PCT/KR2018/002985 dated Aug. 22, 2018, 4 pages.

Notice of Preliminary Rejection dated Jul. 30, 2021 in counterpart Korean Application No. KR10-2017-0032992 and English-language translation.

Notice of Patent Grant dated Feb. 18, 2022 in counterpart Korean Application No. KR 10-2017-0032992 and English-language translation.

* cited by examiner

600

| Door serial | D-key | Type | DRK | Level | Expire Count | Valid Date | Location | Issuer |
|---|---|---|---|---|---|---|---|---|
| 601 | 603 | 605 | 607 | 609 | 611 | 613 | 615 | 617 |

FIG.6

DOOR LOCK DEVICE AND CONTROL METHOD FOR DOOR LOCK DEVICE

This application is the U.S. national phase of International Application No. PCT/KR2018/002985 filed on Mar. 14, 2018 which designated the U.S. and claims priority to KR Patent Application No. 10-2017-0032992 filed on Mar. 16, 2017, the entire contents of each of which are hereby incorporated by reference.

FIELD

Various embodiments of the disclosure relate to a control method of a door lock device.

DESCRIPTION OF RELATED ART

Recently, with the development of communication technologies, technologies which generate a key capable of unlocking a door lock device in an electronic device to release the locked state of the door lock device have been developed. The door lock releasing system is referred to as a "smart key system" and may be used in various fields, such as vehicles, buildings, and houses.

The door lock device which receives a key from an electronic device to release a door lock may be installed in a vehicle so as to release the locked state of a door, a trunk, and a starting device of the vehicle.

SUMMARY

In the smart key system, a relay attack may occur while a key is transmitted to a door lock device. Thus, the door lock device may be exposed to abnormal access. Various embodiments of the disclosure provide a door lock device capable of preventing such a relay attack.

A door lock device according to various embodiments may include: a communication unit configured to receive a key and location information of an electronic device from the electronic device; a location information reception unit configured to receive location information of the door lock device; a door lock unit configured to be in a locked state or an unlocked state; and a controller electrically connected to the communication unit, the location information reception unit, and the door lock unit, wherein the controller may determine a distance between the electronic device and the door lock device on the basis of the location information of the electronic device and the location information of the door lock device, and may determine whether to unlock the door lock unit on the basis of information on the distance.

The controller may determine the distance between the electronic device and the door lock device on the basis of a signal received from the electronic device through the communication unit.

The controller may determine a movement direction of the electronic device on the basis of a signal received from the electronic device through the communication unit, and may determine whether to unlock the door lock unit on the basis of the movement direction of the electronic device.

The controller may unlock the door lock unit by using the key when the distance is shorter than a predetermined distance.

The controller may unlock the door lock unit by using the key when the electronic device is positioned within a predetermined area from the door lock device.

The controller may transmit notification information to the electronic device when a key configured to unlock the door lock device is received through the communication unit while the electronic device is spaced a predetermined distance or more apart from the door lock device.

The door lock unit may include a first door lock and a second door lock, and the controller may selectively release at least one of the first door lock and the second door lock on the basis of the key.

The key may further include authentication information for authenticating the electronic device, and the door lock device may determine whether to unlock the door lock unit by using the authentication information. The authentication information may include ID information of the electronic device.

A control method of a door lock device according to various embodiments may include: receiving location information of an electronic device; receiving location information of the door lock device; determining a distance between the electronic device and the door lock device on the basis of the location information of the electronic device and the location information of the door lock device; and determining whether to unlock the door lock unit on the basis of information on the distance.

The method may determine the distance between the electronic device and the door lock device on the basis of a signal received from the electronic device.

The method may further include: determining a movement direction of the electronic device on the basis of a signal received from the electronic device; and determining whether to unlock the door lock unit on the basis of the movement direction of the electronic device.

The method may further include unlocking the door lock unit by using the key when the distance is shorter than a predetermined distance.

The method may unlock the door lock unit by using the key when the electronic device is positioned within a predetermined area from the door lock device.

The method may include: receiving a key configured to unlock the door lock device through the communication unit while the electronic device is spaced a predetermined distance or more apart from the door lock device; and transmitting notification information to the electronic device.

The door lock unit may include a first door lock and a second door lock, and the method may selectively release at least one of the first door lock and the second door lock on the basis of the key.

The key may further include authentication information for authenticating the electronic device, and the method may determine whether to unlock the door lock device by using the authentication information. The authentication information may include ID information of the electronic device.

A door lock device according to various embodiments of the disclosure may determine whether to unlock the door lock device on the basis of a movement direction and a distance between the door lock device and an electronic device transmitting a key. Therefore, the door lock device is safe from a relay attack.

BRIEF DESCRIPTION OF THE DRAWINGS

FIG. 6 illustrates a structure of a key stored in a memory of an electronic device according to various embodiments;

DETAILED DESCRIPTION OF EXAMPLE EMBODIMENTS

Figure 1:
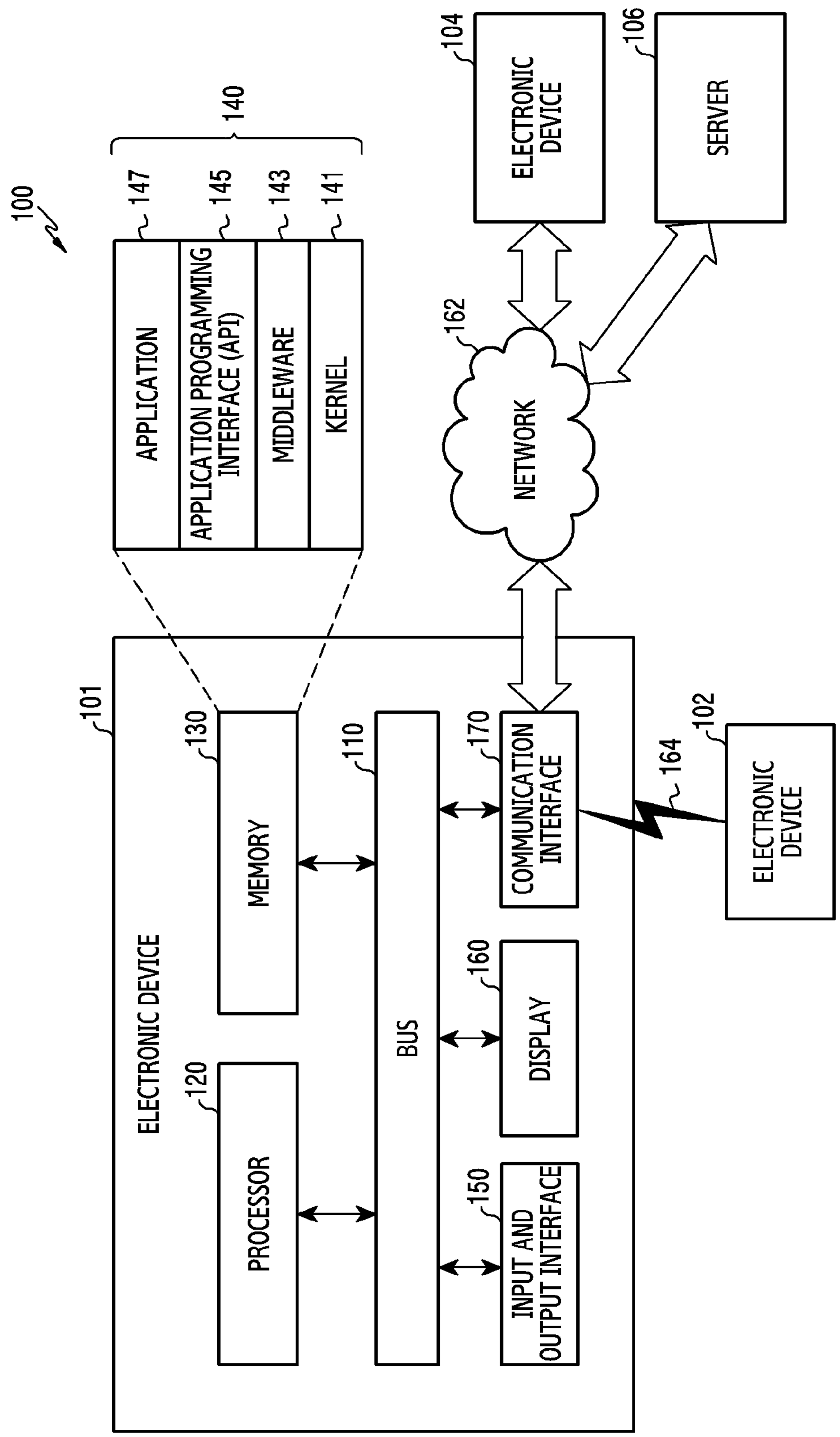
FIG. 1 is a block diagram explaining an electronic device within a network environment in various embodiments.

Hereinafter, various embodiments of the present disclosure will be described with reference to the accompanying drawings. Various embodiments and terms used herein do not limit various embodiments of the present disclosure to the particular forms, and should be understood to include various modifications, equivalents, and/or alternatives of the corresponding embodiments. In the description of the drawings, identical or similar reference numerals are used to designate identical or similar elements. It is to be understood that the singular forms may include plural referents unless the context clearly dictates otherwise. In the present disclosure, an expression such as "A or B," or "at least one of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be at a dedicated processor (such as an embedded processor) for performing a corresponding operation or a generic-purpose processor (such as a Central Processing Unit (CPU) or an application processor) that can perform a corresponding operation by executing at least one software program stored at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device that provide a hotspot function.

The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FUR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

A door lock device according to various embodiments of the present document may be installed or disposed at, for example, a vehicle, an entrance door of a building, an entrance door of a house, a door of a room in a house, a blocking facility of a parking lot, and an office space.

The "key" in the present document may refer to information or data that can be used to release the locked state of the door lock device.

The "signal" in the present document may refer to an electromagnetic wave including the "key".

FIG. 1 is a block diagram explaining an electronic device within a network environment in various embodiments. Referring to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
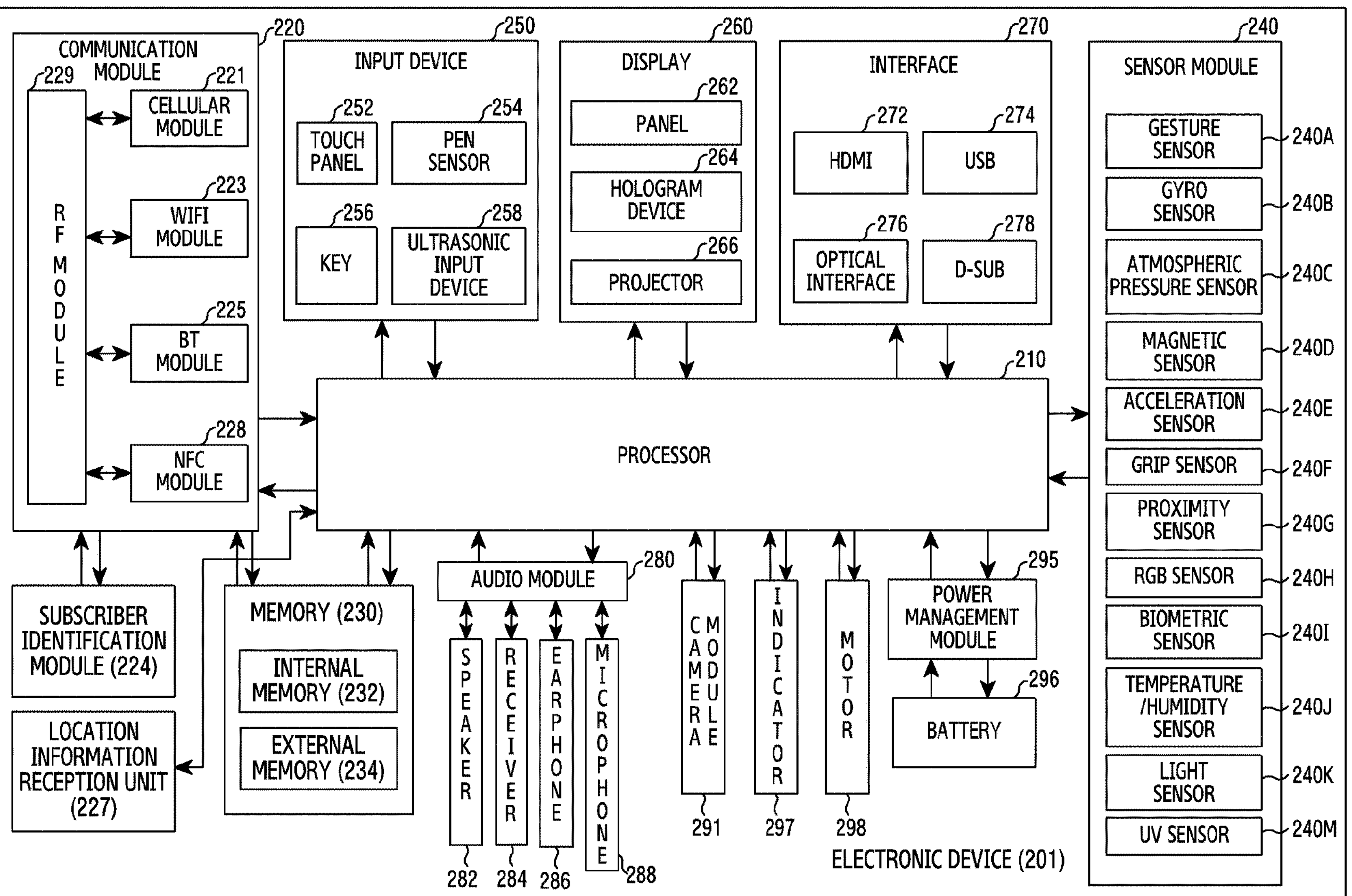
FIG. 2 is a block diagram of an electronic device according to various embodiments.

FIG. 2 is a block diagram of an electronic device 201 according to various embodiments.

The electronic device 201 may include, for example, all or part of the electronic device 101 illustrated in FIG. 1. The electronic device 201 may include: at least one controller (e.g. AP) 210; a communication unit 220; a subscriber identification module 224; a memory 230; a sensor 240; an input unit 250; a display unit 260; an interface 270; an audio unit 280; a camera unit 291; a power management unit 295; a battery 296; an indicator 297; and a motor 298.

The controller 210 may drive, for example, an operating system or application to control multiple hardware or software elements connected to the controller 210, and may process and calculate various kinds of data.

The controller 210 may be implemented, for example, as a system-on-chip (SoC). According to one embodiment, the controller 210 may further include a graphics processing unit (GPU) and/or an image signal processor.

The controller 210 may include at least some (e.g. a cellular module 221) of the elements illustrated in FIG. 2. The controller 210 may load and process commands or data received from at least one of other elements (e.g. nonvolatile memory) in volatile memory, and may store resultant data in the nonvolatile memory.

The communication unit 220 may include, for example, a cellular module 221, a Wi-Fi module 223, a Bluetooth module 225, an NFC module 228, and an RF module 229. The cellular module 221 may provide, for example, a voice call, a video call, a text service, or an Internet service over a communication network. According to one embodiment, the cellular module 221 may identify and authenticate the electronic device 201 in the communication network by using the subscriber identification module (e.g. SIM card) 224. According to one embodiment, the cellular module 221 may perform at least some of the functions that can be provided by the controller 210. According to one embodiment, the cellular module 221 may include a communication controller (CP). According to an embodiment, at least some (e.g. two or more) among the cellular module 221, the Wi-Fi module 223, the Bluetooth module 225, a GNSS module 227, or the NFC module 228 may be included in one integrated chip (IC) or IC package. The RF module 229 may transmit and receive, for example, a communication signal (e.g. an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the Bluetooth module 225, or the NFC module 228 may transmit and receive an RF signal through a separate RF module. The subscriber identification module 224 may include, for example, an embedded SIM or a card including a subscriber identification module, and may include unique identification information (e.g. an integrated circuit card identifier (ICCID)) or subscriber information (e.g. an international mobile subscriber identity (IMSI)).

The communication unit 220 may transmit a key stored in the memory 230 to a door lock device.

A location information reception unit 227 may receive location information of an electronic device from a satellite.

The memory 230 (e.g. memory 130) may include, for example, an internal memory 232 or an external memory 234. The internal memory 232 may include at least one of, for example, volatile memory (e.g. DRAM, SRAM, or SDRAM) and nonvolatile memory (e.g. one-time programmable ROM (OTPROM), PROM, EPROM, EEPROM, mask ROM, flash ROM, flash memory, a hard drive, or a solid-state drive (SSD)). The external memory 234 may include a flash drive, for example, compact flash (CF), secure digital (SD), micro-SD, mini-SD, extreme digital (xD), a multi-media card (MMC), or a memory stick. The external memory 234 may be functionally or physically connected to the electronic device 201 through various interfaces.

The memory 230 may store a key for unlocking a door lock device.

The sensor 240 may measure physical quantities or sense the state of operation of the electronic device 201, and may convert measured or sensed information into an electric signal. The sensor 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g. RGB (red, green, blue) sensor), a biometric sensor 240I, a temperature/humidity sensor 240J, an illuminance sensor 240K, or an ultraviolet (UV) sensor 240M. Additionally or alternatively, the sensor 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor 240 may further include a control circuit for controlling at least one sensor included therein. In an embodiment, the electronic device 201 may further include a controller configured to control the sensor 240, as a part of the controller 210 or independently thereof, and thus may control the sensor 240 while the controller 210 is in a sleep state.

The input unit 250 may include, for example, a touch panel 252, a (digital) pen sensor 254, a key 256, or an ultrasonic input unit 258. The touch panel 252 may use at least one of, for example, a capacitive scheme, a pressure-sensitive scheme, an infrared scheme, or an ultrasonic scheme. Further, the touch panel 252 may further include a control circuit. The touch panel 252 may further include a tactile layer and thus may provide a tactile response to a user. The (digital) pen sensor 254 may be, for example, a part of the touch panel, or may include a separate recognition sheet. The key 256 may include, for example, a physical button, an optical key, or a keypad. The ultrasonic input unit 258 may sense, through a microphone (e.g. microphone 288), ultrasonic waves generated in an input instrument and may identify data corresponding to the sensed ultrasonic waves.

The display unit 260 (e.g. the display 160) may include a panel 262, a hologram device 264, a projector 266, and/or a control circuit for controlling the same. The panel 262 may be implemented, for example, to be flexible, transparent, or wearable. The panel 262 may include the touch panel 252 and one or more modules. According to one embodiment, the panel 262 may include a pressure sensor (or force sensor) capable of measuring the intensity of pressure of a user's touch. The pressure sensor may be implemented to be integrated with the touch panel 252 or may be implemented as at least one sensor provided independently of the touch panel 252. The hologram device 264 may use light interference to display a three-dimensional image in the air. The projector 266 may project light onto a screen to display an image thereon. The screen may be positioned, for example, inside or outside the electronic device 201. The interface 270 may include, for example, an HDMI 272, a USB 274, an optical interface 276, or D-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The audio unit 280 may bidirectionally convert, for example, a sound or electric signal. At least some elements of the audio unit 280 may be included in, for example, the input/output interface 145 illustrated in FIG. 1. The audio unit 280 may process sound information which is input or output through, for example, a speaker 282, a receiver 284, an earphone 286, or a microphone 288. The camera unit 291 is a device which can capture, for example, a static image or a moving image, and, according to one embodiment, may include one or more image sensors (e.g. a front sensor or a rear sensor), a lens, an image signal processor (ISP), or a flash (e.g. LED or xenon lamp). The power management unit 295 may manage, for example, power of the electronic device 201. According to one embodiment, the power management unit 295 may include a power management integrated circuit (PMIC), a charging IC, or a battery or fuel gauge. The PMIC may have a wired charging scheme and/or a wireless charging scheme. The wireless charging scheme may include, for example, a magnetic-resonance scheme, a magnetic-induction scheme, or an electromagnetic-wave scheme, and may further include an additional circuit for wireless charging, for example, a coil loop, a resonance circuit, or a rectifier. The battery gauge may measure, for example, the remaining capacity, charging voltage, current, or temperature of the battery 296. The battery 296 may include, for example, a rechargeable battery and/or a solar battery.

The indicator 297 may indicate the specific state of the electronic device 201 or a part thereof (e.g. the controller 210), for example, a booting state, a message state, or a charge state. The motor 298 may convert an electric signal into a mechanical vibration, and may generate a vibration, or a haptic effect. The electronic device 201 may include, for example, a mobile TV support device (e.g. a GPU) that can process media data according to standards such as digital multimedia broadcasting (DMB), digital video broadcasting (DVB), mediaFlo™, or the like.

Each of the elements described in the present document may include one or more components, and the name of the corresponding element may vary depending on the type of an electronic device. In various embodiments, some of the elements of an electronic device (e.g. the electronic device 201) may be omitted, or the electronic device may further include additional elements. Alternatively, some of the elements may be combined to form a single entity, and thus, may equivalently execute the functions of the corresponding elements prior to the combination thereof.

Figure 3:
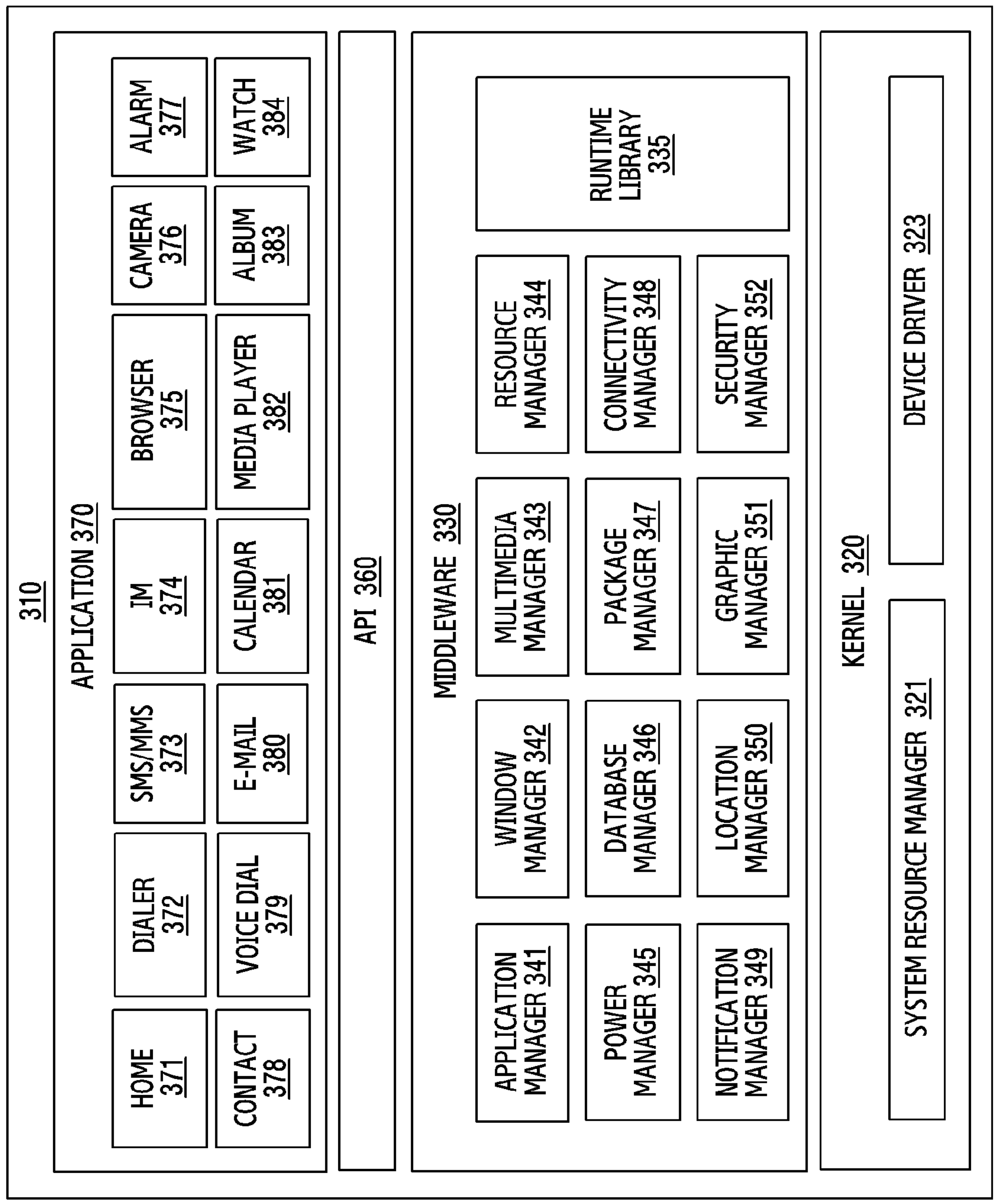
FIG. 3 is a block diagram of a program module according to various embodiments.

FIG. 3 is a block diagram of a program module according to an embodiment of the present disclosure.

A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

Figure 4:
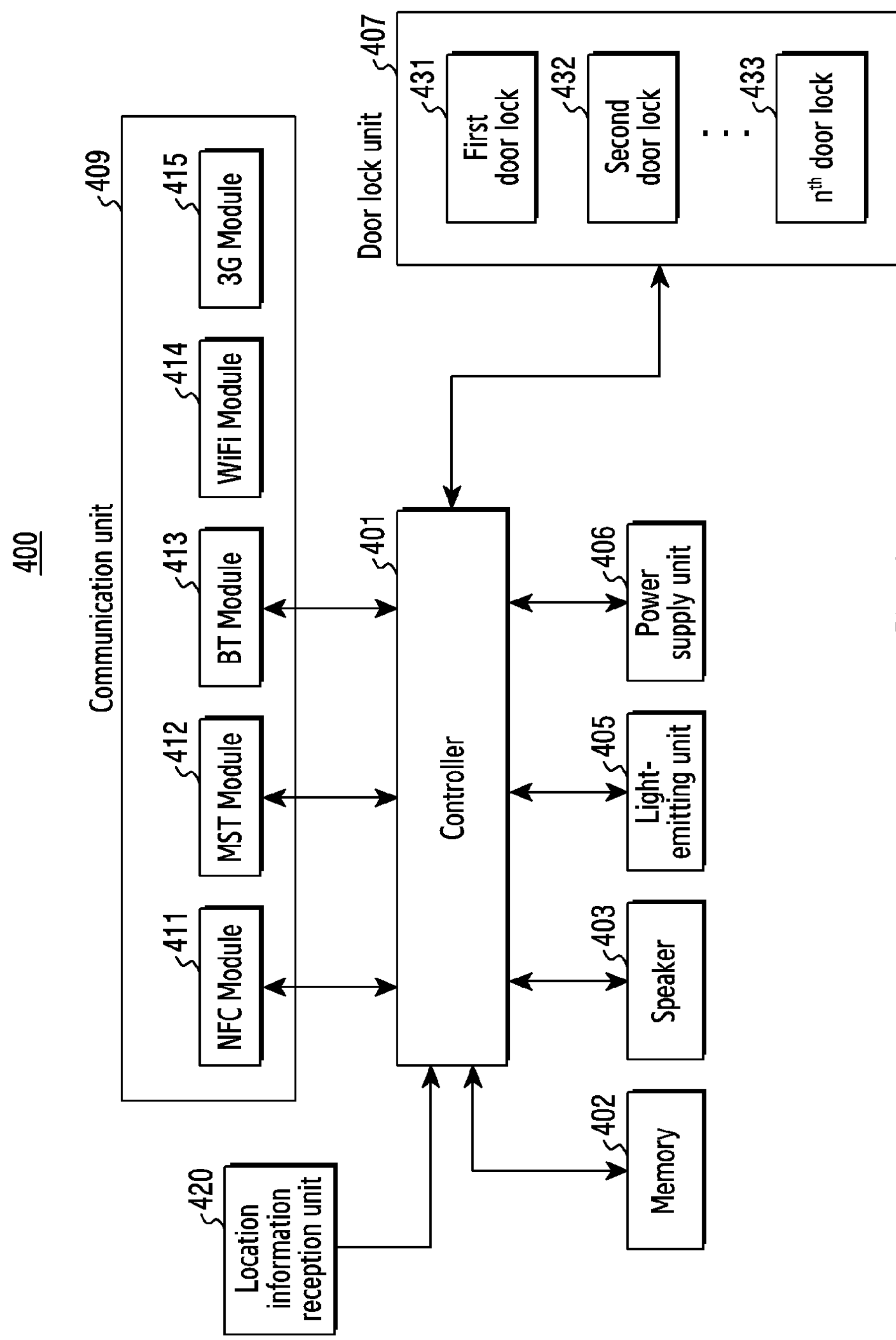
FIG. 4 is a block diagram of a door lock device according to various embodiments.

FIG. 4 is a block diagram of a door lock device according to various embodiments.

Referring to FIG. 4, a door lock device 400 may include a controller 401, a communication unit 409, a door lock unit 407, a speaker 403, a light-emitting unit 405, a power supply unit 406, a memory 402, and a location information reception unit 420.

The communication unit 409 may include an NFC module 411, an MST module 412, a Bluetooth module 413, a Wi-Fi module 414, and a long-distance communication module (e.g. a 3g, 5g, or 5G module 415).

The communication unit 409 may receive a key and location information of an electronic device from the electronic device. In an embodiment, the location information of the electronic device may be included in the key.

Specifically, the door lock device 400 may receive a key from the electronic device by using a near field communication module (e.g. the NFC module 411, MST module 412, or Bluetooth module 413), or may receive the key through a long-distance communication module such as a 3G module. The key may be encoded and transmitted from the electronic device. Further, the door lock device 400 may receive location information of the electronic device through the near-field communication module or long-distance communication module.

The door lock device may have a unique credential that can be used to release a door lock, and the credential may be provided by a manufacturer during the manufacture of the door lock device. Further the door lock device may be provided with a credential through a server. The door lock device may be not only attached to gates of houses, buildings, and offices, but may also be installed in a movable means such as a vehicle (e.g., an automobile).

In the present document, the key may be interpreted to refer to an authentication means including a function of releasing a door lock as well as the roles of a key for starting a vehicle, a virtual key for operating an electronic device, and a virtual key for financial transactions.

The door lock unit 407 may include multiple door locks 431, 432, and 433, and may be in a locked or unlocked state. The fact that the door lock unit 407 is in a locked or unlocked state means that at least one of the multiple door locks 431, 432, and 433 included in the door lock unit 407 is in a locked or unlocked state.

The multiple door locks 431, 432, and 433 may include a motor or an electromagnet, and may lock or unlock a door. For example, the first door lock 431 may be a vehicle door. The second door lock 432 may be a vehicle trunk. The third door lock 433 may be a vehicle engine starting device.

When the door lock device 400 has been normally unlocked, the speaker 403 may output a predetermined sound under the control of a controller. The speaker 403 may not be included in the door lock device 400 depending on embodiments.

When the door lock device 400 has been unlocked normally, the light-emitting unit (e.g. LED) may emit light in a predetermined pattern or predetermined color under the control of the controller. The light-emitting unit 405 may not be included in the door lock device 400 depending on embodiments.

The power supply unit 406 (e.g. a battery of a vehicle) supplies power to the door lock device 400.

The memory 402 may store credential data that can be used to unlock the door lock device 400. The credential data is generated by a manufacturer during the manufacture of the door lock device, and may be stored in the memory. In the description below, for convenience, credential data stored in the memory 402 of the door lock device may be referred to as first credential data, and credential data transmitted from the electronic device will be referred to as second credential data.

The controller 401 may control the communication unit 409, the door lock unit 407, the memory 402, the speaker 403, and the light-emitting unit 405.

The controller 401 may control the door lock unit 407 to be in an unlocked or locked state.

For example, when a key is transmitted from the electronic device, the door lock device 400 receives the key through the communication unit, obtains second credential data from the received key, and compares the second credential data with first credential data stored in the memory 402. As a result of the comparison, when the first credential data and the second credential data match each other, the controller 401 may control the door lock unit 407 to release a locked state.

When the door lock device 400 has been unlocked normally, the controller 401 may control the speaker to output a predetermined sound.

Alternatively, when the door lock device 400 has been unlocked normally, the controller 401 may control the light-emitting unit to emit light in a predetermined pattern or a predetermined color.

Alternatively, when the door lock device 400 has been unlocked normally, the controller 401 may control the Bluetooth module 413 to transmit data corresponding to successful unlocking to the electronic device.

The location information reception unit 420 may be, for example, a global positioning system (GPS), a global navigation satellite system (GLONASS), a BeiDou navigation satellite system (hereinafter, "BeiDou"), or Galileo (European global satellite-based navigation system). The location information reception unit 420 may receive location information of the door lock device 400. When the door lock device 400 is installed in a vehicle, the location information reception unit 420 may be included in a navigation system installed in the vehicle.

That is, the door lock device 400 may receive the location information of the door lock device from the navigation system installed in the vehicle.

Meanwhile, the door lock device 400 may acquire the location information from a signal received through the communication unit. Specifically, the controller 401 may acquire the location information by using indoor positioning techniques (e.g. triangulation technique).

The controller 401 may determine the distance between the electronic device and the door lock device on the basis of the location information of the electronic device and the location information of the door lock device, and may determine whether to unlock the door lock unit on the basis of the distance.

The memory 402 may store information on the valid area, valid distance, or valid angle in which the key can operate. The information on the valid area, valid distance, or valid angle may be registered by a manufacturer at the time of manufacture of the door lock device, or may be registered by a user.

The controller 401 may use the location information of the electronic device and the location information of the door lock device to calculate the distance between the electronic device and the door lock device, and may determine whether the calculated distance belongs to the valid area, valid distance, or valid angle, which is stored in the memory 402.

When the distance between the electronic device and the door lock device belongs to the valid area, valid distance, or valid angle, the controller 401 may unlock the door lock unit 407 by using a key received from the electronic device.

Meanwhile, the controller 401 may determine the distance between the electronic device and the door lock device on the basis of a signal received from the electronic device through the communication unit. The signal received from the electronic device may be a signal including a key, or may be a separate signal for measuring the distance. Specifically, the controller 401 may measure the intensity of a signal received from the electronic device and may determine the distance between the electronic device and the door lock device on the basis of the result of the measurement.

When the distance between the electronic device and the door lock device is shorter than a predetermined distance, the controller 401 may unlock the door lock unit 407 by using a key transmitted from the electronic device.

Further, the controller 401 may determine the movement direction of the electronic device on the basis of a signal received from the electronic device through the communication unit. Specifically, the controller 401 may analyze a signal received through the communication unit to determine the location at which the signal has been transmitted, and may determine the movement direction of the electronic device on the basis of the location. The signal used in determining the movement direction of the electronic device may be a signal including a key transmitted by the electronic device, or may be a separate signal for measuring the direction.

When the movement direction of the electronic device corresponds to the valid angle stored in the memory, the controller 401 may unlock the door lock unit 407.

When the electronic device is positioned within a predetermined area from the door lock device, the controller 401 may unlock the door lock unit 407 by using a key.

Further, the controller 401 may transmit notification information to the electronic device when a key configured to unlock the door lock device is received through the communication unit while the electronic device is spaced a predetermined distance or more apart from the door lock device.

Meanwhile, the door lock unit 407 may include a first door lock 431 and a second door lock 432. The controller 401 may selectively release at least one of the first door lock 431 and the second door lock 432 on the basis of a key received from the electronic device.

The key, which the door lock device 407 has received from the electronic device, may include data which may be used in selecting at least one of multiple door locks. For example, the key may include data which can release the locked state of at least one of a door and a trunk of a vehicle. The data constitutes a field of the key, and a specific example thereof will be described later. The controller 401 may selectively release the locked state of at least one of the door and the trunk of the vehicle by using the data.

The key, which the electronic device transmits to the door lock device, may further include authentication information for authenticating the electronic device. Specifically, the authentication information may include ID information of the electronic device (e.g. the MAC address of the electronic device or the name of the electronic device).

When authentication information of the electronic device is found in a received key, the door lock device 400 may determine that the received key is valid. The authentication information may include ID information of the electronic device.

The door lock device 400 may acquire authentication information from a key received from the electronic device at the time point at which the key is initially registered, and may store the acquired authentication information in the memory 402. The door lock device 400 may compare the authentication information of the electronic device stored in the memory 402 with authentication information obtained from the key transmitted by the electronic device, and may release the locked state of the door lock unit 407 when the authentication information of the electronic device is identical to the authentication information obtained from the key.

In various embodiments, some elements of the door lock device 400 may be omitted, or the door lock device may further include additional elements. Alternatively, some of the elements may be combined to form a single entity, and thus, may equivalently execute functions of the corresponding elements prior to the combination thereof.

Figure 5:
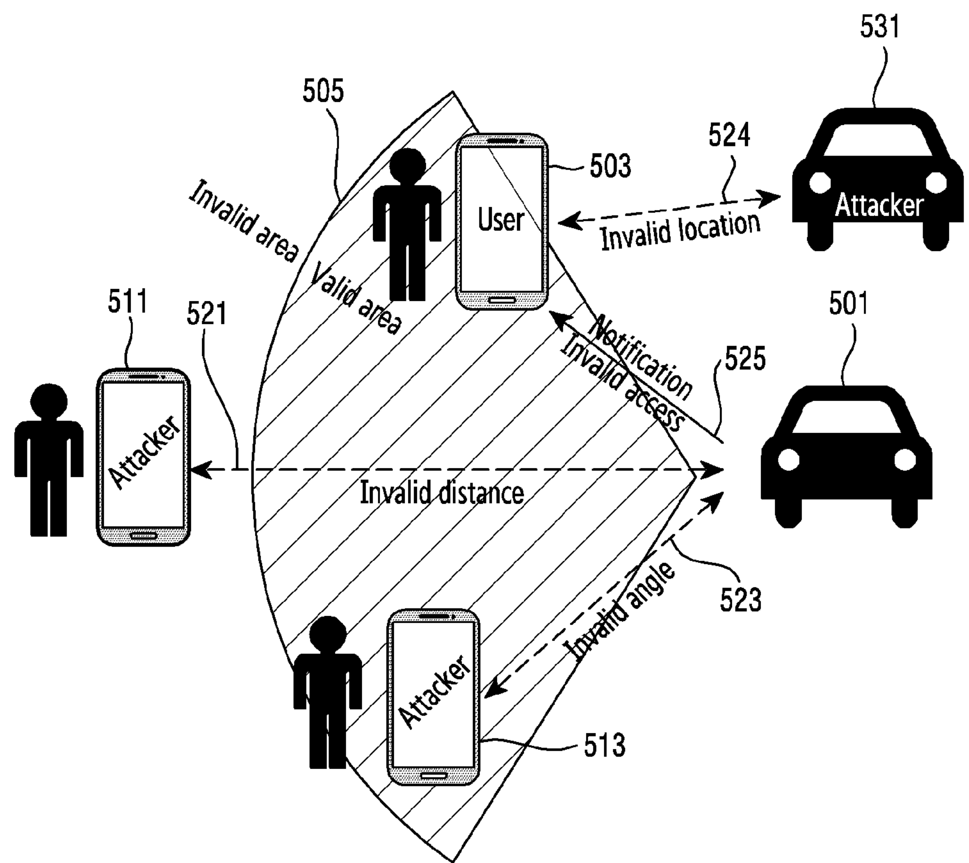
FIG. 5 illustrates an operation between an electronic device and a door lock device according to various embodiments.

FIG. 5 illustrates an operation between an electronic device and a door lock device according to various embodiments.

Referring to FIG. 5, illustrated are an electronic device 503, a vehicle having a door lock device 501 installed therein, and relay attackers 511, 513, and 531.

The relay attacker 511, 513, or 531 may be, for example, a smartphone or vehicle of a third party performing a relay attack. The relay attacker 511, 513, or 531 may intercept a key being transmitted by the electronic device 503, and the smartphone-type relay attacker 511 or 513 may transmit the intercepted key to the door lock device 501 in an attempt to unlock the door lock device 501.

For example, when the electronic device 503 transmits a key in order to unlock the door lock device 501, the relay attacker 511 may receive the key being transmitted to the door lock device 501 and may store the received key in the memory. The relay attacker 511 may transmit the key stored in the memory to the door lock device 501.

When the key is received, the door lock device 501 may analyze data included in the key to determine whether the key was transmitted by the electronic device 503 of a user or was transmitted by the relay attacker 511.

Specifically, the door lock device 501 may receive a key through a communication unit, and may obtain, from the received key, ID information of a device which has transmitted the key. When the ID information obtained from the key is identical to ID information stored in the door lock device 501, the door lock device 501 may release the locked state of the door lock device 501 by using the received key.

When the ID information is not determined to be identical to the ID information stored in the door lock device 501, the door lock device 501 may maintain the locked state of the door lock device 501. Further, the door lock device 501 may transmit notification information indicating "abnormal access" to the user's electronic device 503.

The door lock device 501 may determine the distance between the electronic device 503 and the door lock device 501 on the basis of location information of the electronic device 503 transmitted from the electronic device 503 and location information of the door lock device 501, and may determine whether to unlock a door lock unit on the basis of information on the distance.

The door lock device 501 may configure a virtual boundary line 505 within a range of a predetermined distance and a predetermine angle from the door lock device 501. The virtual boundary line 505 may be configured by a user, or may be configured by a predetermined area by the door lock device 501.

When a key is received from a device inside the virtual boundary line 505, the door lock device 501 may use the received key to unlock the door lock unit of the door lock device 501, and when a key is received from a device outside the virtual boundary line 505, the door lock device 501 may maintain the locked state of the door lock unit of the door lock device 501.

For example, when a key is received from the relay attacker 511, the distance between the relay attacker 511 and the door lock device 501 is beyond the virtual boundary line, and thus the door lock device 501 may maintain the door lock unit of the door lock device 501 in a locked state.

The door lock device 501 may obtain location information of the relay attacker 511 from the key received from the relay attacker 511 to determine the direction and distance between the door lock device 501 and the relay attacker 511.

Alternatively, the door lock device 501 may use the key received from the relay attacker 511 or 513 to determine the direction and distance between the door lock device 501 and the relay attacker 511 or 513. The door lock device 501 may measure a received signal strength indicator (RSSI) of a key to determine the distance and direction. Further, the door lock device 501 may receive an RSSI measuring signal separately from a key to determine the distance and direction.

The door lock device 501 may monitor the movement direction of the electronic device 503 and may determine the validity of a received key signal on the basis of the movement direction and distance of the electronic device 503. For example, when a user in the vehicle 501 gets out of the vehicle with the electronic device 503 and moves away, the door lock device 501 may measure the movement direction and movement distance of the electronic device 503 while continuously receiving a signal transmitted from the electronic device 503, and may store the measured movement direction and distance in the memory.

When a key is received from the relay attacker 513, the door lock device 501 installed in the vehicle may determine that the received key signal is invalid on the basis of the movement direction and distance of the electronic device 503, and may remain in a locked state.

Meanwhile, when a key is received from the relay attacker 511 or 513, the door lock device 501 may transmit notification information to the electronic device 503. The notification information may be transmitted to the user in the form of a text or voice message.

As another example, the door lock device 501 can also respond to a vehicle-type relay attacker 531 masquerading as a door lock device.

For example, the electronic device 503 has location information of the door lock device 501, and may add the location information of the door lock device 501 to a key, and may then transmit the key to the door lock device 501.

When the relay attacker 531 masquerades as the door lock device and receives the key, since the key includes the location information of the door lock device 501, the relay attacker 531 in an invalid location 524 cannot use the key even though the attacker receives the key from the electronic device 503.

According to an embodiment, the electronic device 503 may receive location information of a door lock device through a communication unit, and may control the communication unit to transmit a key to the door lock device on the basis of the location information of the door lock device. For convenience, in the description, the door lock device will be referred to as a vehicle 501.

If a user is in the vehicle 501, location information of the vehicle 501 may be substantially identical to location information of the electronic device 503. The electronic device 503 may compare location information received from the vehicle 501 with the location information of the electronic device 503, and, when there is a difference therebetween, may determine that the user has exited the vehicle 501. Thereafter, when it is determined that the received location information of the vehicle 501 has not changed for a predetermined time, the electronic device 503 may determine that the vehicle 501 is parked and may store final location information of the vehicle 501 in a memory.

Further, in this situation, when the user moves away from the vehicle and is outdoors, the movement direction and movement distance of the electronic device 503 may be measured on the basis of a signal received from a location information reception unit of the electronic device 503 and a signal output from a sensor unit.

When the user is indoors or the location information reception unit does not receive the location information of the electronic device 503, the electronic device 503 may measure the movement direction and movement distance of the electronic device by using well-known indoor positioning technique.

Specifically, the sensor unit (reference numeral 240 in FIG. 2) of the electronic device 503 may include a gyro sensor and an acceleration sensor. The electronic device 503 may measure the movement direction and movement distance of the electronic device 503 by using signals output from the gyro sensor and the acceleration sensor.

Meanwhile, the electronic device 503 may use location information stored in the memory to determine whether to transmit a key to the vehicle 501.

For example, a key may be transmitted to the vehicle 503 (door lock device) only when a user is within a predetermined distance from the vehicle 501. On the other hand, when the user is far away from the vehicle 501, a key may not be transmitted to the vehicle.

FIG. 6 illustrates a structure of a key stored in a memory of an electronic device according to various embodiments.

Referring to FIG. 6, the key may include multiple data fields 601 to 617.

The field 601 may be a serial number of a door lock device. The serial number may be designated by a user, or may be provided by a door lock device manufacturer.

The field 603 is credential data that can be used to unlock the door lock device. That is, the field 603 may be a unique number for releasing the locked state of the door lock device.

The field 605 may indicate the type of a key. The type may be data for determining whether a door is fixedly positioned like an entrance door or is movable like a door or trunk of a vehicle. Further, the type may be data indicating a key for operating a specific device, such as a key for starting a vehicle.

The field 607 may be data used to decode an encoded key.

The field 609 may be data indicating the authority level of a key. For example, as in a vehicle, when a single key can be used to open a door or trunk of the vehicle and to start the vehicle, the key can be used to open only the trunk of the vehicle if the field 609 has a value of 1, can be used to open the door and the trunk if the field 609 has a value of 2, and can be used not only to open the door and the trunk but also to start the vehicle if the field 609 has a value of 3.

The field 611 may be data indicating the number of times a key can be used. For example, if the field 611 has a value of 5, the key can be used up to five times.

The field 613 may be data indicating a valid period during which a key can be used. The field 613 may be a date or a period of time (hours).

For example, if the field 613 has a value of 20161231, a key can be used only to Dec. 31, 2016 and cannot be used thereafter. Alternatively, if the field 613 has a value of 24 hours, a key can be used only for 24 hours after the key is issued.

The field 615 may be location information of the electronic device that transmits the key.

The field 617 may include information on an issuer that issued the key. For example, information on a door lock device manufacturer may be included.

According to various embodiments, in the fields included in the key 600, elements may be omitted, or additional elements may be further included. Alternatively, some elements may be combined to form a single entity.

Figure 7:
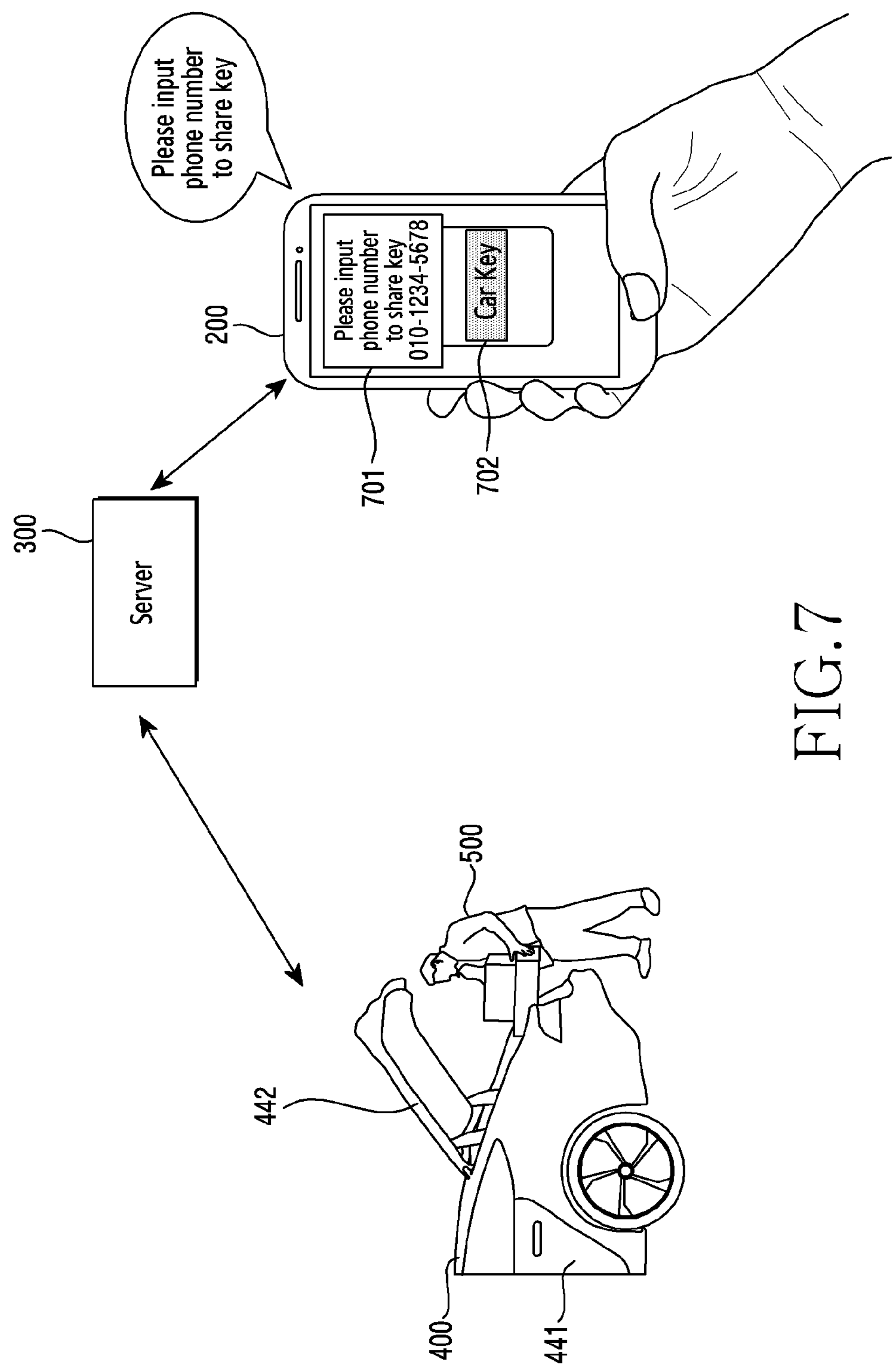
FIG. 7 illustrates an example in which an electronic device shares a key with a third party to open a trunk of a vehicle according to various embodiments.

FIG. 7 illustrates an example in which an electronic device shares a key with a third party to open a trunk of a vehicle according to various embodiments.

For convenience of description, a scenario in which a user in an office transmits, to a courier, a key to be used to open a trunk 442 of a vehicle parked at home will be assumed and described.

An electronic device 200 is the user's electronic device and is in an office.

An electronic device 500 is the courier's electronic device and is adjacent to a vehicle 400 in which door lock devices 441 and 442 are installed. The door lock device 441 may be, for example, a door of the vehicle, and the door lock device 442 may be a trunk of the vehicle.

When the user executes a smart key application in the electronic device 200 and then selects "key sharing", a UI 701 for inputting information on a person with whom to share a key may be displayed on a screen. When the user inputs the information (e.g. phone number, use period, and authority) on a person with whom to share a key and then requests sharing in the electronic device 200, the electronic device 200 may add the input information to a key stored in a memory of the electronic device 200 and transmit the key to a server 300.

For example, when the user selects a key 702 to be shared, and inputs the courier's phone number, unlocking of only a trunk, a valid period of one time, a use period of one day, etc., the related information may be added to the corresponding fields of a key (reference numeral 600 in FIG. 6).

The electronic device 200 may add additional information to a key (reference numeral 600 in FIG. 6) and may transmit the key to the server 300. The server 300 may transmit the key 702 to the electronic device 500 of the courier with reference to the phone number of the courier.

The electronic device 500 may transmit the key 702 received from the server 300 to the vehicle 400 in order to open the trunk 442. The electronic device 500 may delete the received key 702 from a memory on the basis of authority information included in the key. In the present embodiment, if the valid period is one time, the electronic device 500 may use the key 702 only once in order to unlock the trunk 442 of the vehicle 400, and may then delete the received key 702 from the memory.

Figure 8:
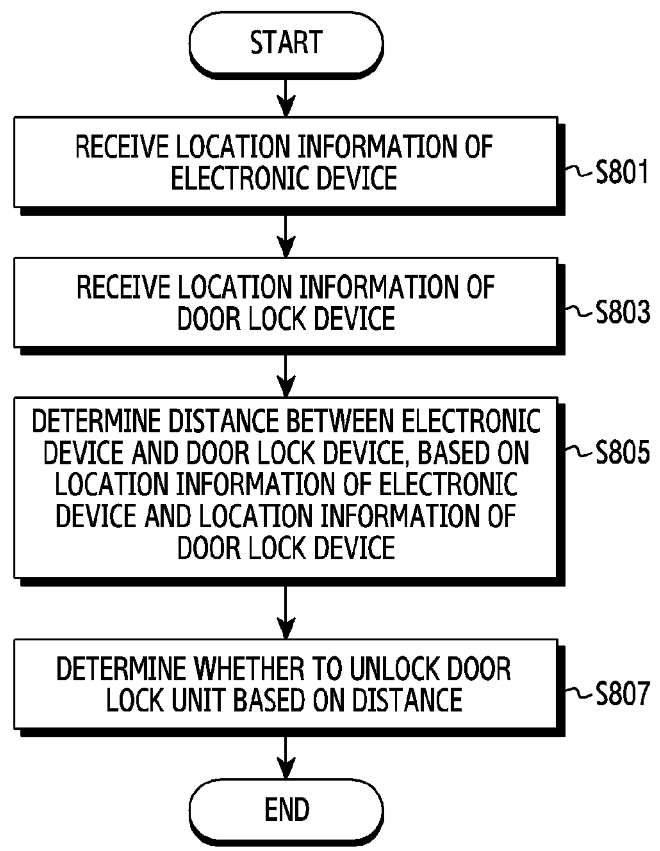
FIG. 8 is a flowchart of a processing operation when a door lock device has received a key from an electronic device.

FIG. 8 is a flowchart of a processing operation when a door lock device has received a key from an electronic device.

The door lock device receives location information of the electronic device (S801). The location information of the electronic device may be included in a key or may be transmitted independently of the key. The door lock device may obtain the location information of the electronic device from the received key. Alternatively, the door lock device may obtain the location information of the electronic device from the electronic device through a communication unit.

The door lock device receives location information of the door lock device (S803). The location information of the door lock device may be obtained through a location information reception unit (e.g. a GPS) included in the door lock device. If the door lock device is positioned indoors, the door lock device may obtain the location information by using indoor positioning techniques (e.g. triangulation technique).

The door lock device determines the distance between the electronic device and the door lock device on the basis of the location information of the electronic device and the location information of the door lock device (S805).

On the basis of the distance, the door lock device determines whether to unlock a door lock unit (S807). When the distance between the electronic device and the door lock device is shorter than a predetermined distance, the door lock device unlocks the door lock unit by using a received key. When the distance between the electronic device and the door lock device is longer than the predetermined distance, the door lock device maintains the door lock unit in a locked state. Further, the door lock device may transmit, to the electronic device, notification information indicating abnormal access to the electronic device.

Meanwhile, the door lock unit of the door lock device may include a first door lock and a second door lock. When a key is received from the electronic device, the door lock device may selectively release at least one of the first door lock and the second door lock on the basis of the key.

For example, when the door lock device is installed in a vehicle, the first door lock may be connected to a vehicle door, and the second door lock may be connected to a vehicle trunk. The key received by the door lock device may include information for selecting at least one of the first door lock or the second door lock. The door lock device may use the information to drive the first door lock and/or control the second door lock so as to release the locked state of the vehicle door and/or the vehicle trunk.

The key may include authentication information for authenticating the electronic device, and the door lock device may use the authentication information to determine whether to unlock the door lock device. The authentication information may include ID information of the electronic device (e.g. a MAC address, the name of the electronic device, etc.).

The door lock device may also determine the distance between the electronic device and the door lock device on the basis of a signal received from the electronic device. Further, the door lock device may determine a direction between the electronic device and the door lock device on the basis of a signal received from the electronic device, and may determine whether to unlock the door lock unit, on the basis of the determined direction. A description thereof has been made in detail by using FIG. 5, and will thus be omitted.

The term "module", as used herein, includes a unit configured to hardware, software, or firmware. The term "module" can be interchangeably used with terms such as "logic", "logical block", "component", "circuit", or the like. A module can be an integral component, or a minimum unit for performing one or more functions or may be a part thereof. A module can be mechanically or electrically implemented. For example, a module, according to an embodiment of the present disclosure, can include an Application-Specific Integrated Circuit (ASIC) chip, a Field-Programmable Gate Arrays (FPGAs), or a programmable-logic device, which are known or will be developed and which perform certain operations.

At least some parts of a device (e.g., modules or functions thereof) or a method (e.g., operations), according to embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

What is claimed is:

1. A door lock device comprising:

a communication unit, comprising a communication circuit, configured to receive a key information and location information of an electronic device from the electronic device, wherein the key information includes authentication information for authenticating the electronic device;

a location information receiver configured to receive location information of the door lock device;

a door lock configured to be in a locked or unlocked state; and a controller electrically connected to the communication unit, the location information receiver, and the door lock, wherein the controller is configured to:

determine a movement direction of the electronic device, and a distance between the electronic device and the door lock device on the basis of the location information of the electronic device and the location information of the door lock device;

identify a validity of the key information based on the movement direction and the distance;

determine that the door lock is in a locked state when the distance is longer than a predetermined distance or the movement direction is out of a predetermined angle;

determine that the door lock is in an unlocked state using the key information when the distance is shorter than the predetermined distance and the movement direction is within the predetermined angle; and transmit notification information indicating abnormal access to the electronic device when the distance is longer than the predetermined distance or the movement direction is out of the predetermined angle.

2. The device of claim 1, wherein the controller is configured to determine the movement direction of the electronic device on the basis of a signal received from the electronic device through the communication unit.

3. The device of claim 1, wherein the controller is configured to unlock the door lock by using the key information when the distance is shorter than the predetermined distance.

4. The device of claim 1, wherein the controller is configured to unlock the door lock by using the key information when the electronic device is positioned within a predetermined area relative to the door lock device.

5. The device of claim 1, wherein the controller is configured to transmit notification information to the electronic device when the key information configured to unlock the door lock device is received through the communication unit while the electronic device is spaced the predetermined distance or more apart from the door lock device.

6. The device of claim 1, wherein the door lock comprises a first door lock and a second door lock, and the controller is configured to selectively release at least one of the first door lock and the second door lock on the basis of the key information.

7. The device of claim 1, wherein the door lock device is configured to determine whether to unlock the door lock on the basis of the authentication information.

8. The device of claim 1, wherein the authentication information comprises ID information of the electronic device.

9. The device of claim 1, wherein the controller is configured to determine the distance between the electronic device and the door lock device on the basis of a signal received from the electronic device through the communication unit.

10. A control method of a door lock device, the method comprising:

receiving a key information and location information of an electronic device from the electronic device, wherein the key information includes authentication information for authenticating the electronic device;

receiving location information of the door lock device;

determining a movement direction of the electronic device, and a distance between the electronic device and the door lock device on the basis of the location information of the electronic device and the location information of the door lock device;

identifying a validity of the key information based on the movement direction and the distance;

determining that the door lock device is in a locked state when the distance is longer than a predetermined distance or the movement direction is out of a predetermined angle;

determining that the door lock device is in an unlocked state using the key information when the distance is shorter than the predetermined distance and the movement direction is within the predetermined angle; and transmitting notification information indicating abnormal access to the electronic device when the distance is longer than the predetermined distance or the movement direction is out of the predetermined angle.

11. The method of claim 10, further comprising:

determining the movement direction of the electronic device on the basis of a signal received from the electronic device.

12. The method of claim 10, further comprising unlocking the door lock device using the key information when the distance is shorter than the predetermined distance.

13. The method of claim 10, further comprising:

receiving the key information configured to unlock the door lock device through the communication unit of the door lock device while the electronic device is spaced the predetermined distance or more apart from the door lock device; and transmitting the notification information to the electronic device.

14. The method of claim 10, wherein the door lock device comprises a first door lock and a second door lock, and the method further comprises selectively releasing at least one of the first door lock and the second door lock on the basis of the key information.

15. The method of claim 10, wherein the method further comprises determining whether to unlock the door lock device by using the authentication information.

16. The method of claim 10, wherein the authentication information comprises ID information of the electronic device.

17. The method of claim 10, wherein determining a distance comprises:

determining the distance between the electronic device and the door lock device on the basis of a signal received from the electronic device.

18. The method of claim 10, further comprising:

unlocking the door lock device using the key information when the distance is shorter than the predetermined distance.

* * * * *